United States Patent [19]

Sekinobu

[11] Patent Number: 5,435,408
[45] Date of Patent: Jul. 25, 1995

[54] SNOW CART

[75] Inventor: Masaaki Sekinobu, Itami, Japan

[73] Assignee: Jacstron Corporation, Hyogo, Japan

[21] Appl. No.: 728,167

[22] Filed: Jul. 10, 1991

[30] Foreign Application Priority Data

Jul. 11, 1990 [JP] Japan .................. 2-184549
Sep. 17, 1990 [JP] Japan .................. 2-247980

[51] Int. Cl.6 .................................. B62M 27/02
[52] U.S. Cl. .................... 180/184; 180/190; 282/14.1
[58] Field of Search ............... 180/182, 183, 184, 185, 180/186, 190; 280/14.1, 21.1, 293

[56] References Cited

U.S. PATENT DOCUMENTS

| Re. 29,657 | 6/1978 | Husted | 180/190 |
|---|---|---|---|
| 1,650,334 | 11/1927 | Eliason | 180/190 |
| 2,835,499 | 5/1958 | Andrén et al. | 280/293 |
| 3,016,965 | 1/1962 | Paul | 180/190 |
| 3,509,955 | 5/1970 | Lichfield | 280/14.1 |
| 3,682,495 | 8/1972 | Zaimi | 180/182 |
| 3,712,396 | 1/1973 | Ende | 180/190 |
| 3,757,880 | 9/1973 | Jones | 180/190 |
| 3,761,040 | 9/1973 | Cummins | 180/9.1 |
| 4,522,420 | 6/1985 | Hannappel | 280/293 |
| 4,714,125 | 12/1987 | Stacy, Jr. | 180/182 |
| 4,714,140 | 12/1987 | Hatton et al. | 180/9.32 |

FOREIGN PATENT DOCUMENTS

| 2431304 | 3/1980 | France | 180/190 |
|---|---|---|---|
| 3644561 | 6/1988 | Germany | 180/190 |

Primary Examiner—Robert J. Oberleitner
Assistant Examiner—Kevin Hurley
Attorney, Agent, or Firm—Schweitzer Cornman & Gross

[57] ABSTRACT

A snow cart having a main body, a caterpillar drive on the main body, a pair of skis each extending along a side of the main body, a seat for a driver of the cart on the main body, a ski holder attaching each ski to the main body to allow vertical displacement of the ski attached thereby relative to the main body, each ski being removably attached to the ski holding means, and means on each ski for selectively relieving the main body from the weight of the driver.

8 Claims, 14 Drawing Sheets

SNOW CART

FIELD OF THE INVENTION

The present invention relates to a snow cart with caterpillar drive and detachable ski running surfaces.

BACKGROUND OF THE INVENTION

This kind of snow cart is generally known from Japanese published patent applications Nos. Sho. 57-15074, and Sho. 55-136677.

Caterpillar drives are known to be provided in the front and rear of the main body of the cart, the front caterpillar drive is usually steered by a handle, or the snow cart is driven by the rear caterpillar drive, and a ski-shaped guide board as a rudder is provided in the front. The ski-shaped rudder is steered by a handle during travel on the snow.

Such conventional snow carts are large, heavy and therefore are expensive, and are generally used for transporting heavy objects or for high speed travel. They have been mostly used for patrolling or amusement of ski slopes. As the load on the main body of the cart is supported only by the caterpillar drives in large snow carts, the caterpillars can sink into soft, deep snow making travel difficult or even impossible. This was ameliorated in the prior art by extending the length of the main body and of the caterpillar drives and thus increasing the snow contacting surface of the drive. Therefore, a size reduction of such carts was generally not possible.

The same problems were encountered in smaller snow carts such as snow mobiles, the load on the main body of the cart is supported by the caterpillar drive, and the guide board steering rudder, its handle and the related coupling mechanism are firmly attached to the front of the main body of the cart. Therefore such carts are too long, such as to fit them into the trunk of a passenger car.

Conventional snow carts are designed to be driven by a driver. Therefore, if a driver skis down from a mountain top which was ascended by a snow cart, the mountain will have to be scaled by foot or by a passenger of another driven cart to recover the cart left on the top.

SUMMARY OF THE INVENTION

It is an object of the present invention to provide a small, lightweight and inexpensive snow cart that can be driven even over deep, soft snow.

Another object of the invention is to provide a snow cart that can be driven by radio remote control.

BRIEF DESCRIPTION OF THE DRAWINGS

These and other objects of the invention can be realized by a snow, cart of the present invention as represented by the drawings wherein.

DETAILED DESCRIPTION OF THE INVENTION

Figure 1:
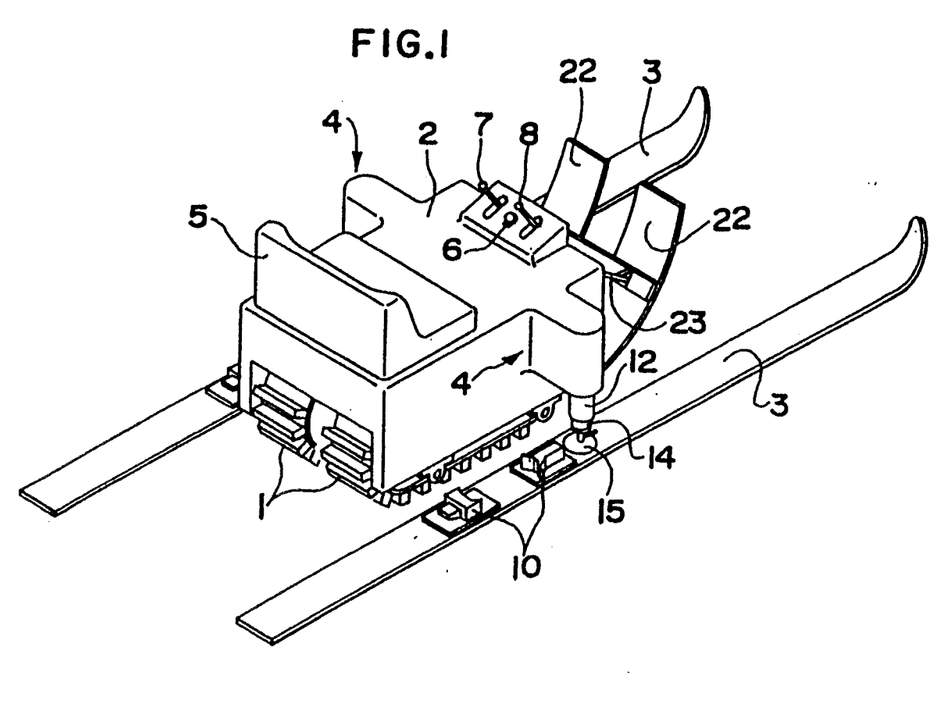
FIG. 1 is a perspective view of an embodiment of a snow cart on the invention.
Figure 2:
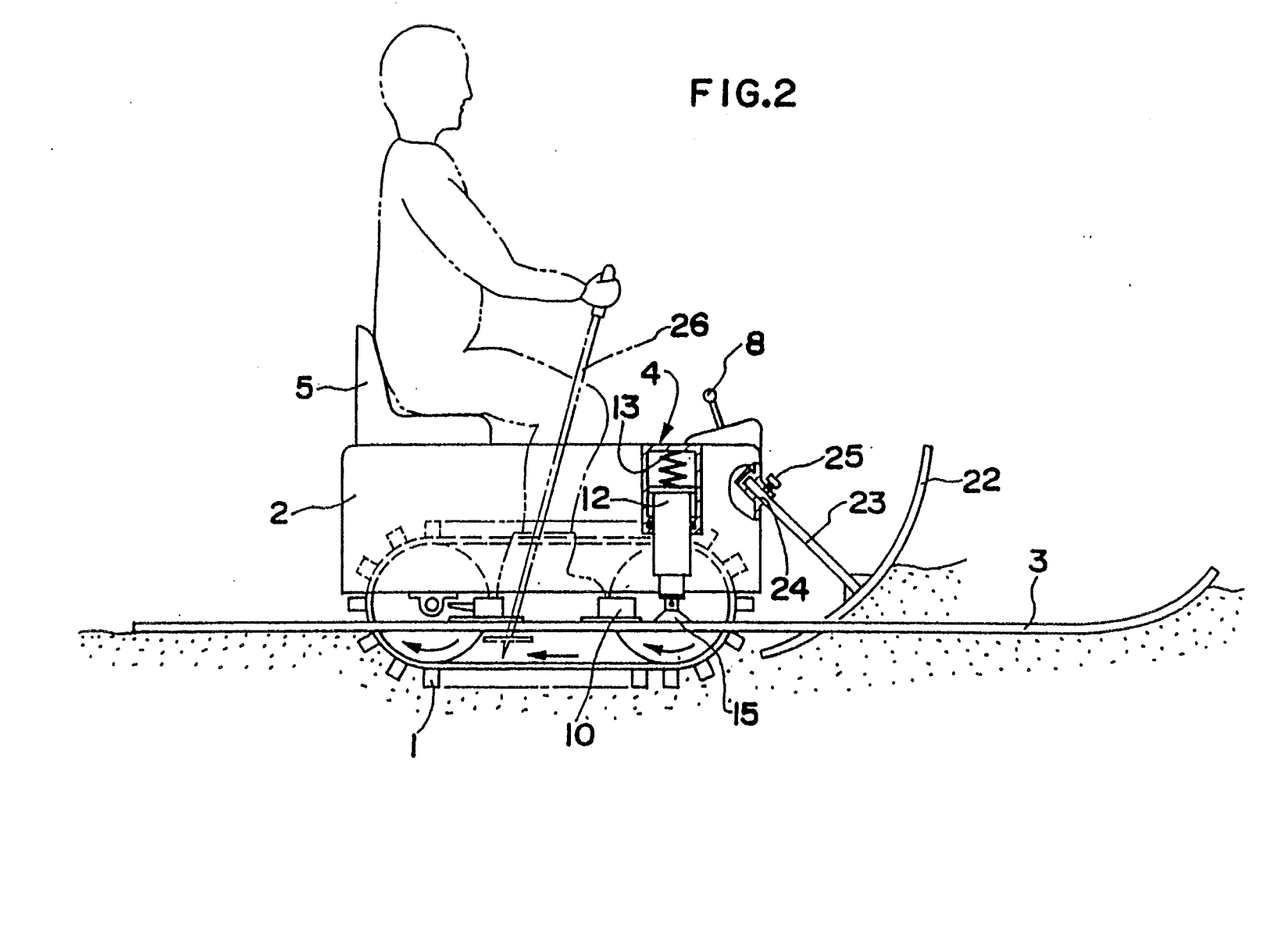
FIG. 2 is a partially cut-away side view of the same.
Figure 3:
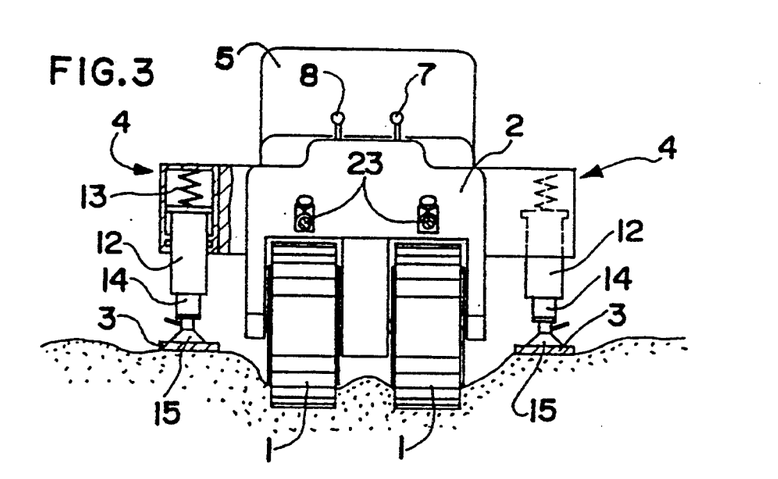
FIG. 3 is a partially cut-away front view of the same.

FIGS. 1–3 show a first embodiment of the snow cart of the present invention, in which a main body 2 of the cost is provided with a near more caterpillar drive or drives 1, adopted to travel over snow, a pair of skis 3, disposed at both sides of the main body 2. Each ski 3 is attached to a ski mounting bracket 4, each bracket being located at opposite side of the main body 2.

The cart is driven on the snow at a desired speed (for example, a low speed of 4 km/hour) by the caterpillar drive 1 operated by an attached prime mover (not shown). A seat 5 for the driver is disposed on the rear of the top surface of the main body. A starting switch 6, a throttle control 6, and a clutch 8 for the prime mover are installed on the front of the top surface of the main body. A commercial gasoline engine with a maximum shaft, for example with a torque of 0.38 kgm and a weight of 8.5 kg can be used, for example as the prime mover and it can also contain a reduction gear. Alternatively an electric motor can also be used.

The skis 3 are suitably longer in the traveling direction than the main body 2 (for example, about 1.8 m), and commercial downhill or cross country skis can be used for that purpose. Straps 10 are suitably provided as a binding for fastening the boots of the driver suitably near the middle of each ski.

Figure 4:
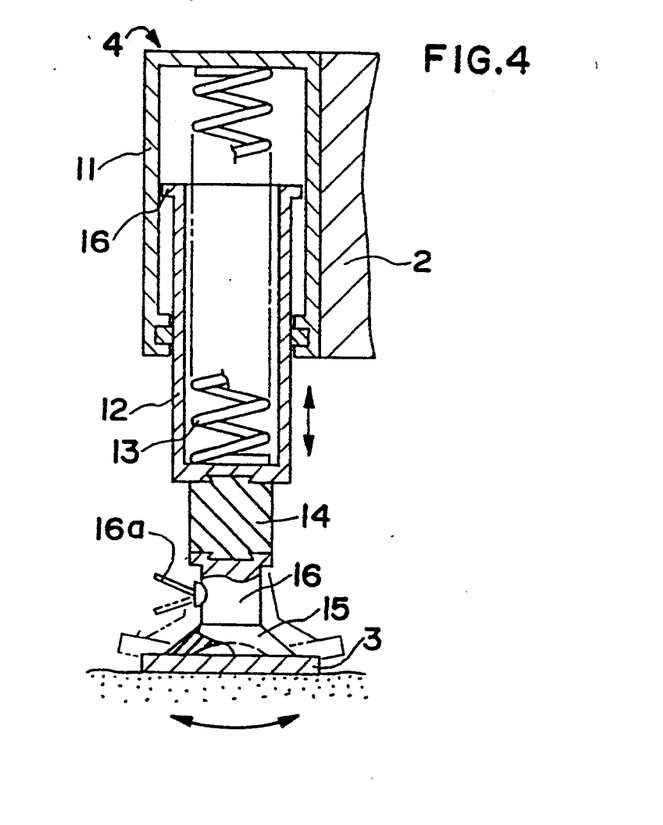
FIG. 4 is a cross sectional view of the ski mounting part of the same.

A ski mounting bracket 4 is shown e.g. in FIG. 4. In each bracket a rod 12 is adapted to telescope within a cylinder 11 that is disposed within the main body 2. The lift rod 12 is thrust downwardly by a spring 13 within the cylinder 11. The lifting rod 12 at its lower end is attached to an adjustable joint 14 and a suction cup 15 is used removably to attach a ski 3 from the lifting rod 14. A suction cup attaching device having a handle 16a is provided between the adjustable joint 14 and the suction cup 15. The ski mounting bracket can be used slightly to incline the forward ends of the skis 3 upwardly by about 10 degrees to avoid the skis burrowing into the snow, especially when the cart travels up hill on a steep slope having an inclination angle of 10 degrees or more.

When the driver rides on the main body 2, and sits on the seat 5, the springs 13 are compressed by the load comprised of the weight of the main body and the body weight of the driver. This load is divided between the skis 3 and the caterpillar drive or drives 1. If desired, the ground (snow) contact area of the caterpillar 1 can be reduced along with the weight of the main body 2. This is advantageous, because it reduces the likelihood of the cart body 2 sinking excessively particularly into deep snow. The skis 3 can securely follow the changes of the terrain and the snow surface due to the force of the springs 13. This can, however, also vary the extent of engagement between the caterpillar drive and the snow surface.

In addition to the spring regulated vertical movement of these skis 3 the adjustable flexible joints 14, permit the skis 3 freely to tilt laterally, as indicated by the two headed arrow and the dotted line in FIG. 4. The skis can also freely tilt longitudinally, as indicated by the two headed arrow and the dotted lines in FIG. 5, and freely rotate horizontally as indicated by the two headed arrow and the dotted lines in FIG. 6. This permits the skis 3 to be freely steered by the motion of feet of the driver, depending on the slope state of the snow surface, and also to follow irregularities in the terrain.

Figure 5:
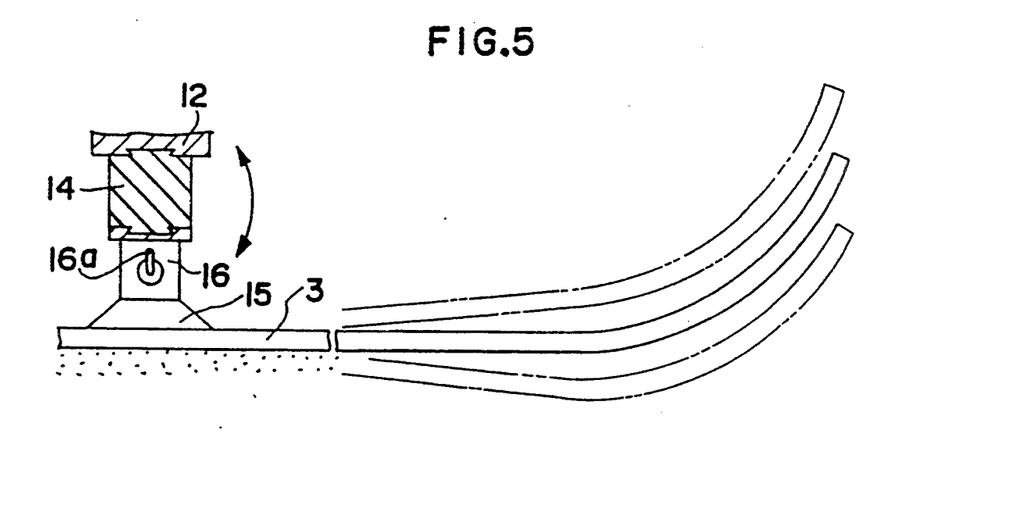
FIG. 5 is a partially cut-away side view of the ski mounting part of the same.
Figure 6:
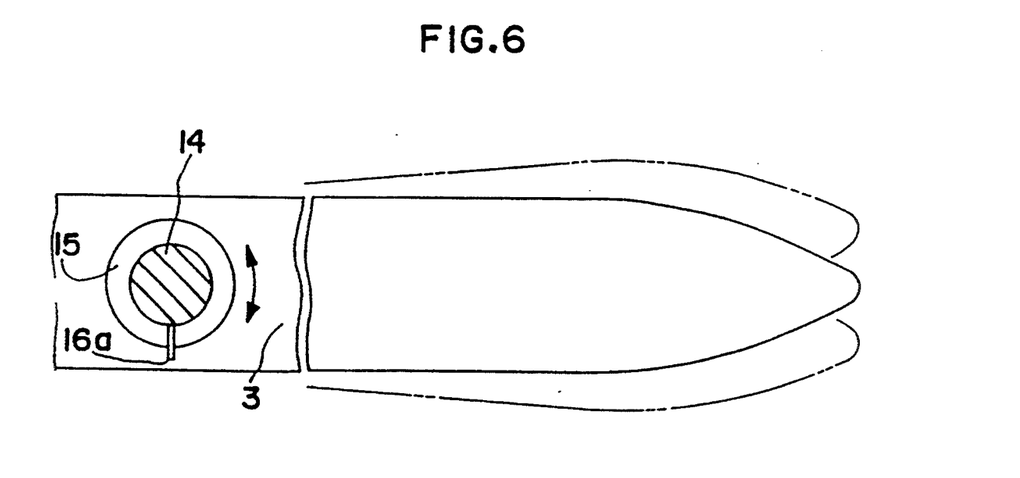
FIG. 6 is a horizontal cross sectional view of the ski mounting part of the same.

Ball joints or other couplings can be used for the flexible joints 14. Suitably elastic materials can be also employed. In the case of elastic materials the inclinations in the skis can be promptly restored to their original position by the tensile characteristics of the elastic material.

The suction cups 15 provided with known manual suction can be attached and detached from the top surfaces of the skis 3 by the suction cup attaching device 16, and attachment and detachment of the skis can be selectively controlled by the lever in a manner known per se. only by pulling up the levers 16a of the suction.

Figure 7:
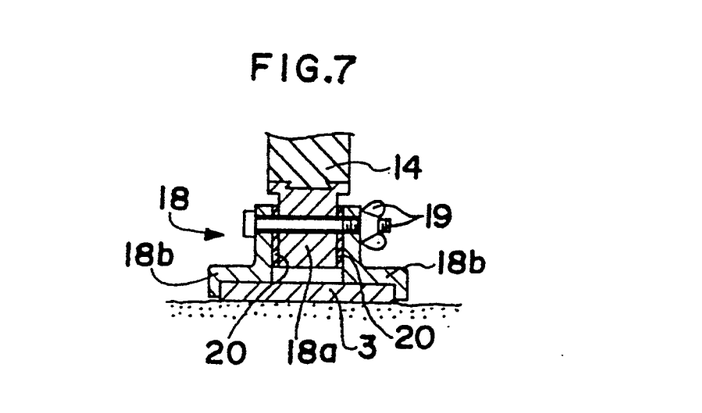
FIG. 7 is a cross sectional view of another embodiment of the ski mounting.

Instead of suction cups 15, in FIG. 7 an alternative mode of attachment is shown. This alternative embodiment 18 has a bracket with a main body 18a that is attached to the lower end of the flexible joint 14, and a pair of ski holding pieces 18b disposed at both sides of the main body 18a. The ski 3 is held from both sides by coupling both holding pieces 18b, 18b with bolt and nut 19 through the main body 18a. A rubber spacer 20 can be suitably employed between the ski holding pieces 18b and the main body 18a.

In FIGS. 1–3 an arcuate snow pressing board or boards 22 are shown disposed in front of the caterpillar drive or drives 1. The end of a support lever 23 or a pair of such levers is inserted into an engaging hole 24 formed at the front of the main body 2 and attached by a bolt 25 press-fitted to the support lever 23. The forward end of each lever 23 rests on the top surface of a corresponding snow pressing board to press down on the snow travel so that the caterpillar 1 always contacts the snow surface. When no skis 3 are attached to the main body 2, the board or boards 22 are also detached from the main body. This also makes it more portable.

In operation, the driver wears the skis 3 on its feet as they are attached to the ski mounting brackets 4, sits on the seat 5, and starts the prime move with the starter switch 6 to rotate and drive the caterpillar drive 1. While the cart travels by gliding over the snow the driver can steer by moving the skis 3 with his feet through the freedom of the flexible joints 14. This permits running on a flat snow surface, or climbing and descending a steep slope of up to about 30 degrees, regardless of whether the snow is deep, powdery, wet, granular or icy.

In addition to steering by feet, if necessary, the driver can also manipulate ski poles 26. This eliminates the need for a steering rudder, handle and the mechanism for coupling them as used in conventional snowmobile type carts. This also permits a substantial reduction in size and weight. For example the length of the main body 2 can be about 70 cm, the width 40 cm, and the height from the top of the main body 2 to the lower surface of the caterpillar 1 to about 50 cm. The weight can suitably be between about 20 and 30 kg. Therefore, the snow cart of the present invention is sufficiently small and can be carried in the trunk of a passenger car.

Figure 8:
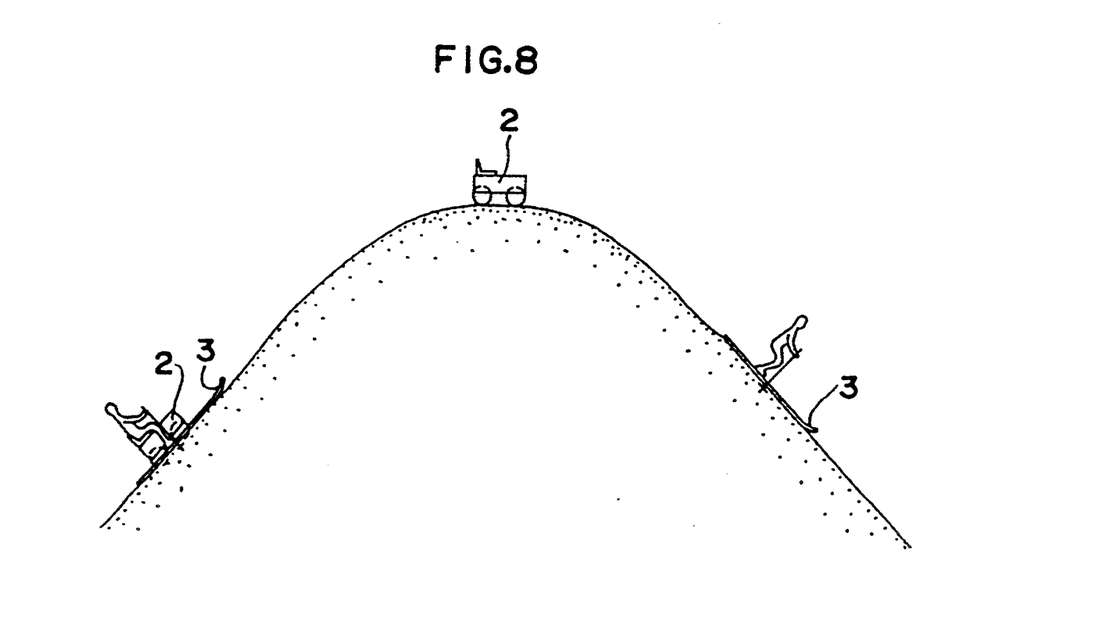
FIG. 8 shows an example of using the snow cart.
Figure 9:
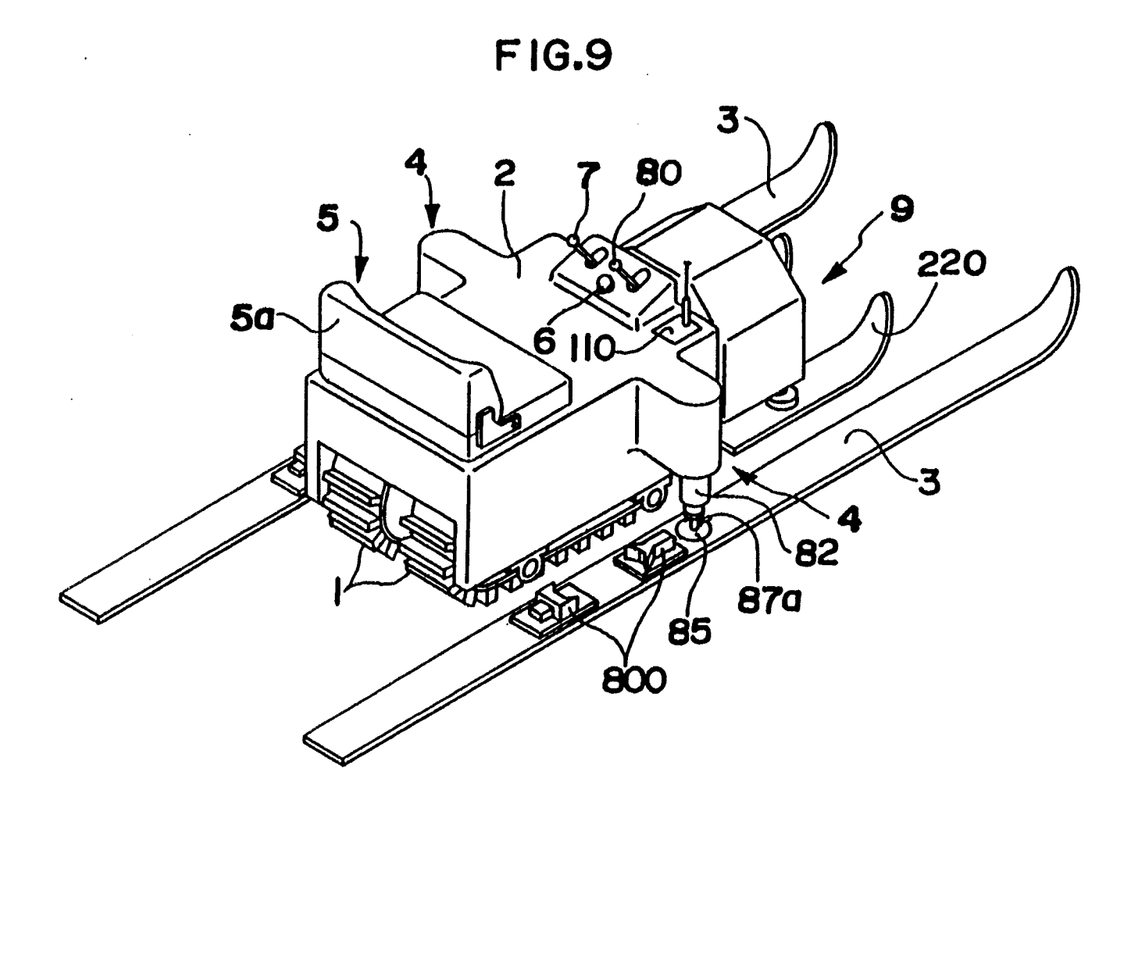
FIG. 9 is a perspective view of another embodiment of the snow cart of the invention.

Increased flexibility of operation can be achieved with the snow cart of the present invention. For example as shown in FIG. 8, after climbing a snow-clad mountain by the snow cart, the skis 3 can be detached from the main body 2, and the driver can descent on the skis 3 alone. In this case, the main body 2 left on the top of the mountain can be recovered by a larger snow cart, or can be returned by remote control by furnishing the main body 2 with a radio controller having at least four or five control channels. Or, since the main body 2 is small and light in weight, the driver can descend on skis even while carrying the main body on his back.

Explaining the results of practical experiments, using for example, a main body 2 of 70 cm length, 40 cm width and 50 cm high was provided with as prime mover a commercial gasoline engine having a maximum shaft torque of 0.38 kgm. A driver weighing 70 kg rode on the snow cart which had a total weight of 30 kg. 1.8 m long skis were used for steering and the following results were obtained:

(i) The cart could be driven stably flat snow and a snowy slope of 30° inclination, at a speed of 4 km/hour regardless of whether the snow was deep, powdery, wet, granular or icy.

(ii) On the right or left slope of deep, powdery, wet, granular and iced snow in an inclination range of 0 to 30 degrees. The cart also ran or climbed obliquely across such a slope being either to the right or to the left, stably at a speed of 4 km/hour, by inclining the both skis either to the right or to the left and applying the right or left edging of the skis.

(iii) In the same conditions as in (ii), depending on the right or left slope, when the right or left edging of the ski was applied, the cart climbed stably while turning right or left at a speed of 3 km/hour.

(iv) When the cart climbed without any skis up a wet snowy slope of 10 degrees, it tumbled after climbing of a distance of 1 meter.

As understood from the above explanation, according to the heretofore disclosed first embodiment of the present invention, the foregoing experiment has demonstrated that when the load on the main body is supported by skis longer than the main body, the ground (snow) contact area of the caterpillar drive can be reduced, and the main body can thus be reduced in size, and the so reduced cart can safely climb a steep slope without tumbling. Furthermore, the free adjustability of the degree of contact of the skis with the snow surface, depending on the stiffness of the snow, enables smooth travel regardless of the quality of the snow.

FIG. 9 to 12 show a second embodiment of the snow cart. In this second embodiment a control device 9 is attached to the front of the main body 2. The driver's seat 5 suitably has a foldable back rest 5a. A remote control radio receiver 110 for four channels is installed in the main body.

Figure 13:
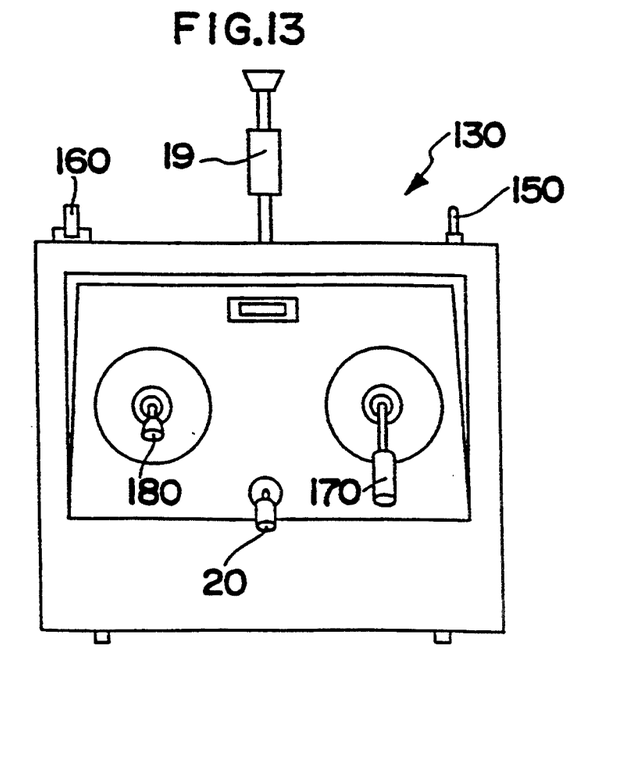
FIG. 13 is a front view of the remote control device for remotely controlling the cart.

As shown in FIG. 13 a remote control device 130 for remotely controlling the cart main body 2, comprises a remote starter switch 150 for starting up a starter (self-starting motor) 140 (see FIG. 19), a remote brake button 160 for manipulating the brake lever 7, a remote accelerator stick 170 for manipulating the throttle control lever 7, a remote rudder stick 180 for manipulating the control device 9, a transmission antenna for sending the command signals by the manipulation of the remote starter switch 150, remote brake button 160, remote accelerator stick, 170, and remote rudder stick 180 to the remote control radio receiver 110, and a transmitter power switch 20.

Figure 14:
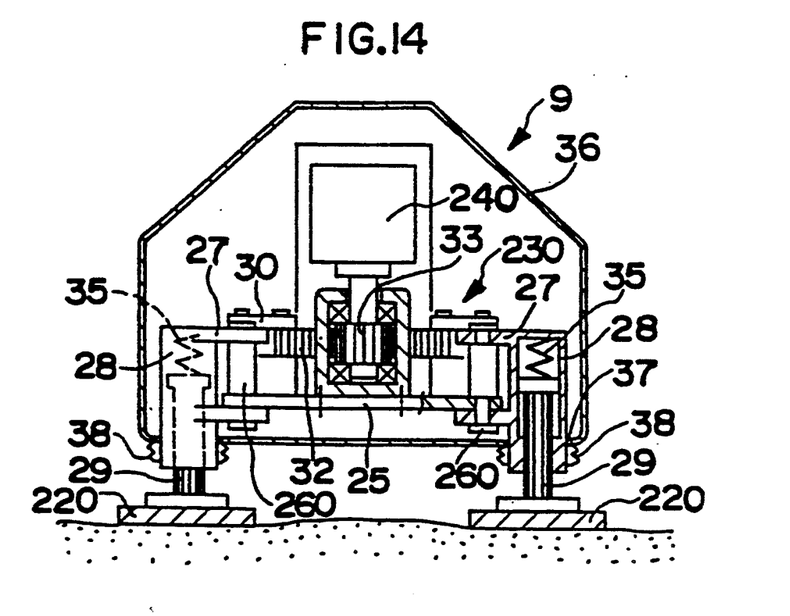
FIG. 14 is a cross sectional view of the steering mechanism of the cart.
Figure 15:
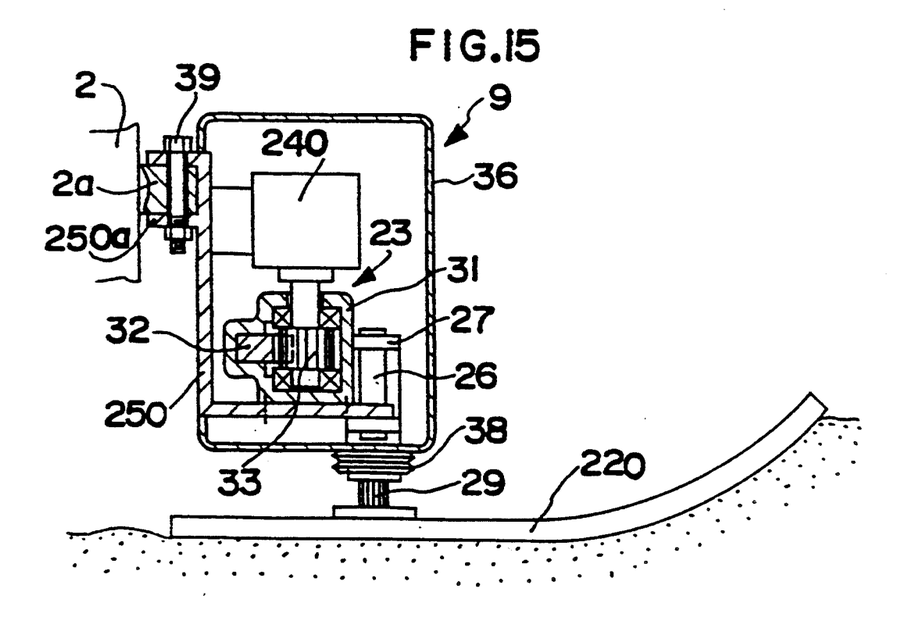
FIG. 15 is a longitudinal cross sectional view of the steering mechanism of FIG. 14.
Figure 16:
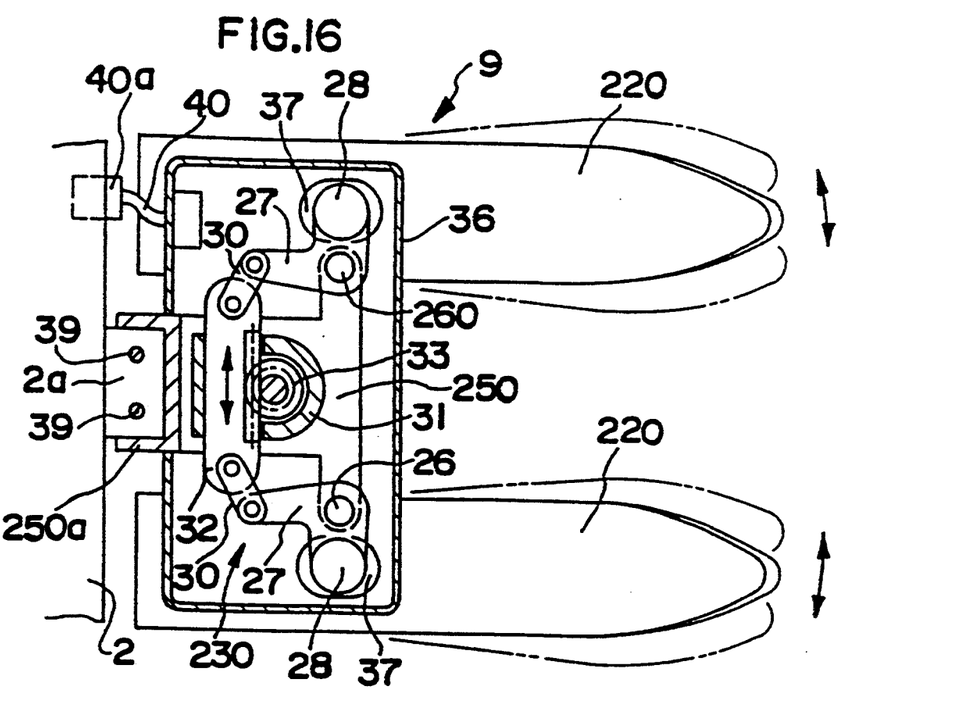
FIG. 16 is a horizontal cross sectional view of the steering mechanism of FIG. 14.

As shown in FIGS. 14 to 16, the control device 9 comprises one or a pair of ski-shaped rudders 220 contacting the snow surface, and a servomotor is provided for rudder 240 for operating the both rudders 220 through a steering device 230.

The steering device 230 is quite similar to the steering gear of an ordinary automobile, in which a pair of knuckle arms 27 are pivoted to both ends of the horizontal part of the a frame 250 with an approximately L-shaped longitudinal section through king pins 260. The lower end of a lift rod 29 is spline-fitted to a cylinder 28 affixed at one end of each knuckle arm 27 is affixed to the upper middle part of each rudder 220. The other ends of the knuckle arms 27 are coupled together by a rack 32 in a gearbox 31 through a tie rod 30. A pinion 33 engageable with the rack 32 is fitted to a motor shaft of the servo motor for rudder 24. By operating the servo motor 240 either in normal of in the reverse direction, the direction of the rudder 220 can be changed about the Icing pin 260 as indicated by the dotted line in FIG. 16.

As shown in FIG. 14, a spring 35 is loaded in the cylinder 28 for pushing the lift rod 29 downwardly. An outer casing 36 is provided for the control device 9, and a snow entry preventing bellows 38 is disposed over the cylinder insertion hole 37 to prevent snow from intruding into the outer casing 36.

As shown in FIG. 15 and FIG. 16, a coupling frame 250a integrally formed at the upper end of the vertical part of the frame 250 is fitted with a coupling protrusion 2a projecting from the front end of the main body 2, and the protrusion 2a and the coupling frame 250a are joined by coupling bolt 39 and a nut. When this snow art is carried, the coupling bolt 39 and its nut are removed, and the coupling frame 250a is detached from the coupling protrusion 2a, permitting the control device 9 and the main body 2 to be carried separately. As shown in FIG. 16, a power cord 40 couples the servomotor 240 for the rudder 220 by inserting its plug 40a into a socket in the front surface of the main body 2. The servomotor 240 is connected to a power source 41 (FIG. 19) such as storage battery in the main body 2.

Figure 17:
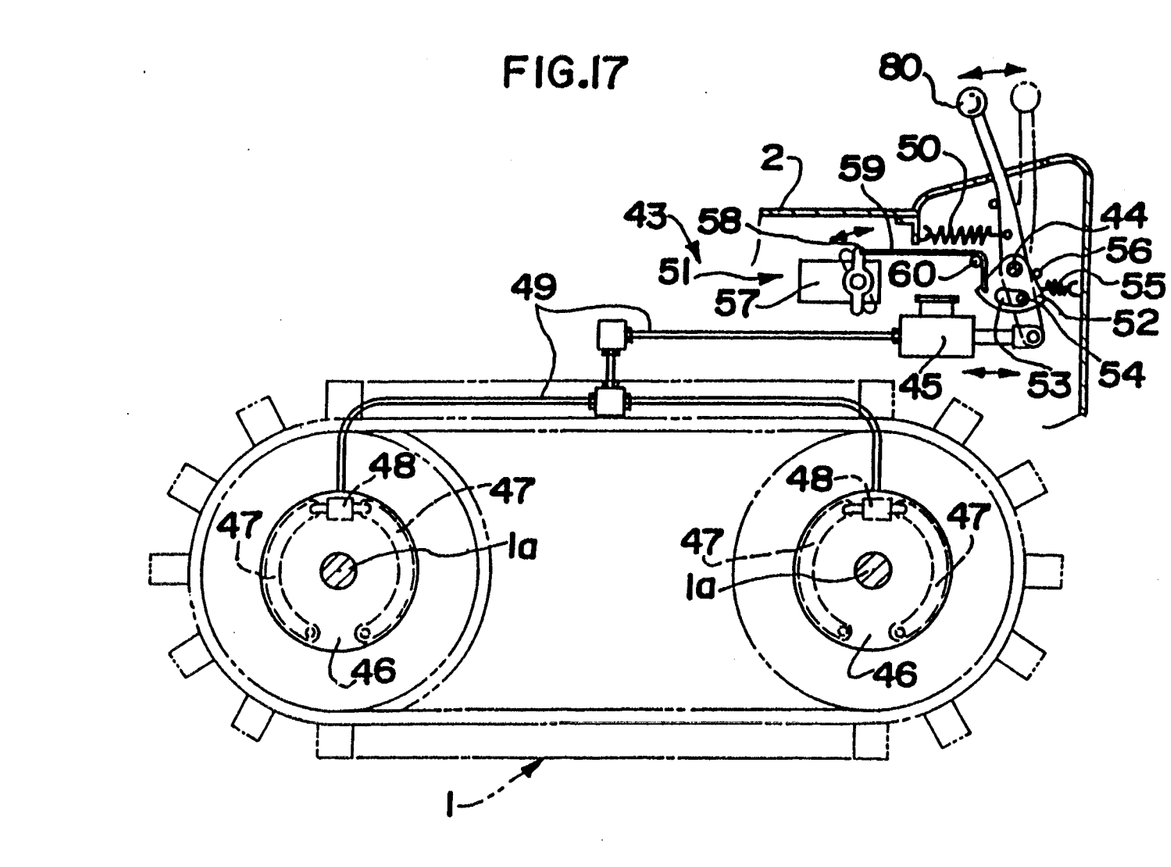
FIG. 17 is a schematic longitudinal cross sectional view of a braking device used in the cart.

FIG. 17 shows a braking device 43 built into the main body 2, in which the lower end part of the brake lever 80 swingable about a fulcrum 44 is coupled with a piston rod of a master cylinder 45. A pair of brake shoes 47 are disposed opposite to the interior of a brake drum 46 mounted on an axle 1a of the caterpillar drive 1. A brake cylinder 48 is mounted within the drum 46 for moving the brake shoes 47 diametrically outwardly into frictional engagement with the interior surface of the brake drum 46 and again out of such engagement. The brake cylinders 48 are connected to the master cylinder 45 by a hydraulic pipe 49. By pushing the brake lever 80 forward to raise as indicated by the two headed arrow and the dotted line in FIG. 17 against the resistance of a spring 50 from the inactive location of the brake lever 80 as shown by the solid line in FIG. 17, the pressure of the oil in the master cylinder 45 is fed into the wheel cylinder 48 to push the brake shoe 47 against the interior surface of the brake drum 46, thereby applying a braking force to the caterpillar 1, similarly to the hydraulic brakes of an ordinary automobile.

As shown in FIG. 17 a remote control brake device 51 contains a sector-shaped engaging plate 52 is pivotable about the fulcrum 44, and an arcuate slot 53 is provided in the plate. An engaging pin 54 ranges into the slot 53 from the brake lever 80. A tension spring 55 is adapted to pull the engaging plate 52 in the inactive direction of the lever 80, and a stopper pin 56 serves to hold the engaging plate 52 in the brake inactive position by resisting the pull of the spring 55. This is intended to prevent the engaging plate 52 from engaging with the brake lever 80 when the brake lever 80 is pushed forward to apply the brake. A brake servo motor 57 serves for the remote movement of the brake through a cable 59 one end of which is linked to lever 58 attached to the shaft of the brake servo motor 57. The other end of the cable 59 is attached to the edge of the engaging plate 52 through a sheave 60. When the brake servo motor 57 is actuated it pushes forward the brake lever 80 from its inactive position as shown by solid line in FIG. 17. The engaging plate 52 is rotated clockwise due to the motor driven rotary lever 58 pulling the cable 59, and thus the brake lever 80 is pushed and raised by the engaging plate 52 through the engaging pin 54, thereby applying the brake. A conventional disc brake can be used in place of the conventional drum brake described above.

Figure 18:
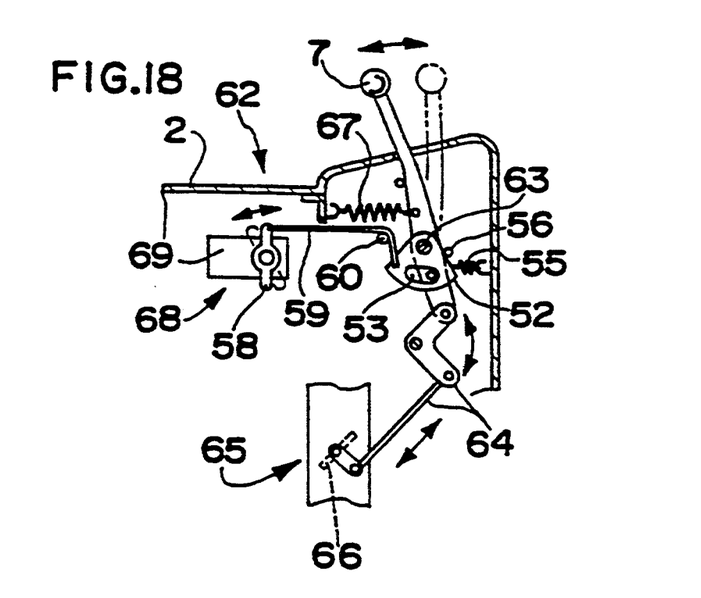
FIG. 18 is a schematic longitudinal cross sectional view of an accelerator used in the cart.

FIG. 18 shows the servo control of a suitable embodiment of an accelerator in the main body 2. The lower end of the accelerator or throttle lever 7 is pivotable about a fulcrum 63 is coupled to a throttle valve 66 of a carburetor 65 through a linkage 64, and when the accelerator lever 7 is pushed forward to raise as indicated by the double headed arrow and the dotted line in FIG. 18 against the bias of a spring 67, the throttle valve 66 is released through the linkage 64, and the fuel feed increases into the prime mover, similarly as in the accelerator of a conventional automobile.

An accelerator remote control 68 is quite similar to the remote control brake device 51. Therefore, its corresponding parts are similarly identified and further description is omitted.

As the accelerator lever 7 is pushed forward an accelerator control servo motor 69 is actuated and the throttle valve 66 is turned in the fuel releasing direction.

Figure 19:
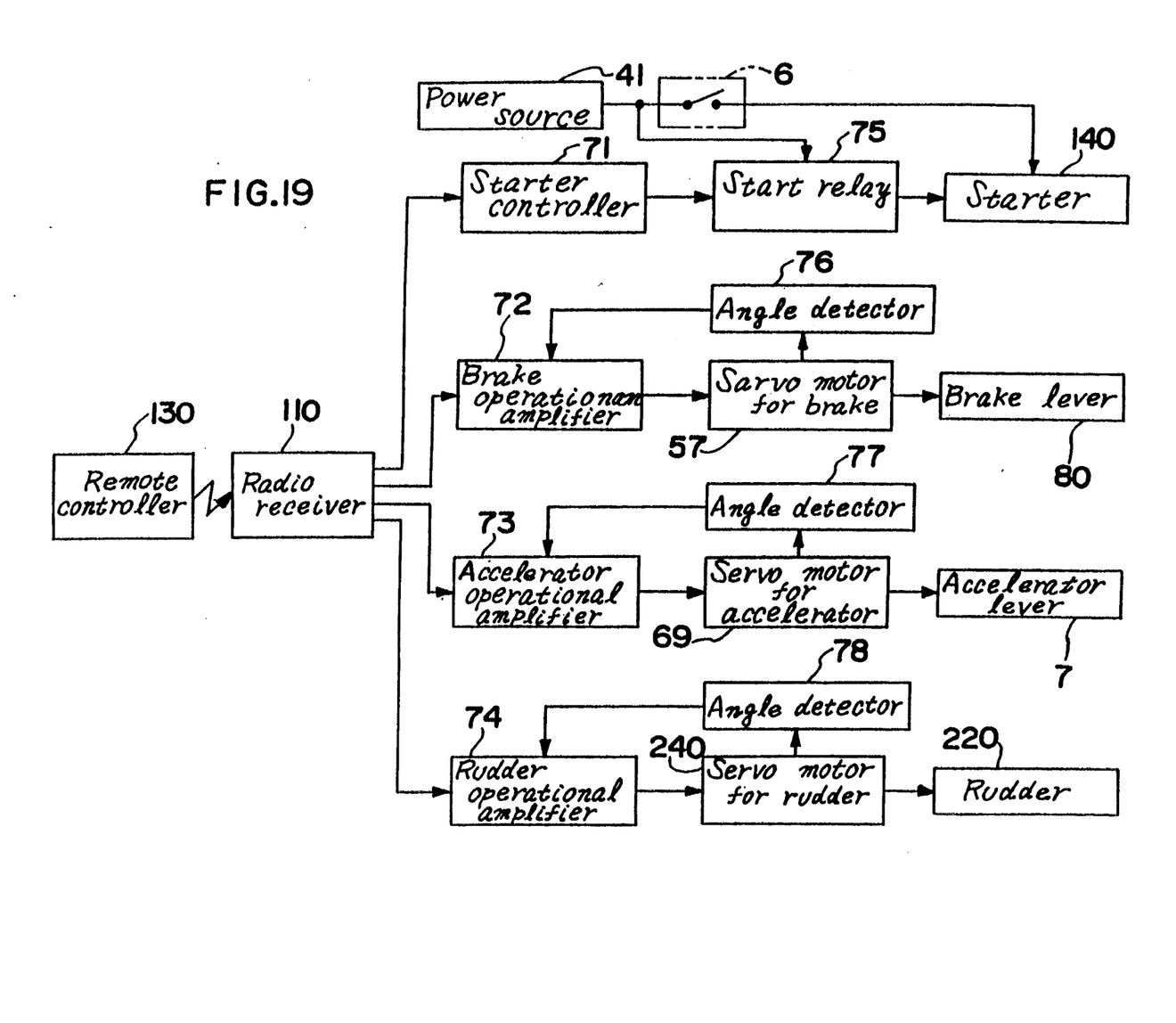
FIG. 19 is a block diagram for explaining the principle of operation by remote control of the cart.

The block diagram of FIG. 19 explains the principle of operation by radio remote control. The command signals from the four channel remote control transmitter 130 is received by the remote control radio receiver 110 and is respectively fed into a starter controller 71, a brake operational amplifier 72, an accelerator operational amplifier 73, and a rudder operational amplifier 74. By its command signal, the starter controller 71 actuates a start relay switch 75 for the prime mover to feed power to the starter 140 from the power source 41, while the brake, accelerator and rudder operational amplifiers 72 to 74 respectively manipulate the servo motors 57, 69, 240, and the detection signals from angle detectors 76 to 78 for detecting the rotational angles of the servo motors 57, 69, 240 are compared with the command signal, and when both signals in each case coincide, the operation of the servo motors 57, 69, 240 is stopped. The main body 2 can be driven, as desired, by controlling the servo motors 57, 69, 240.

Figure 10:
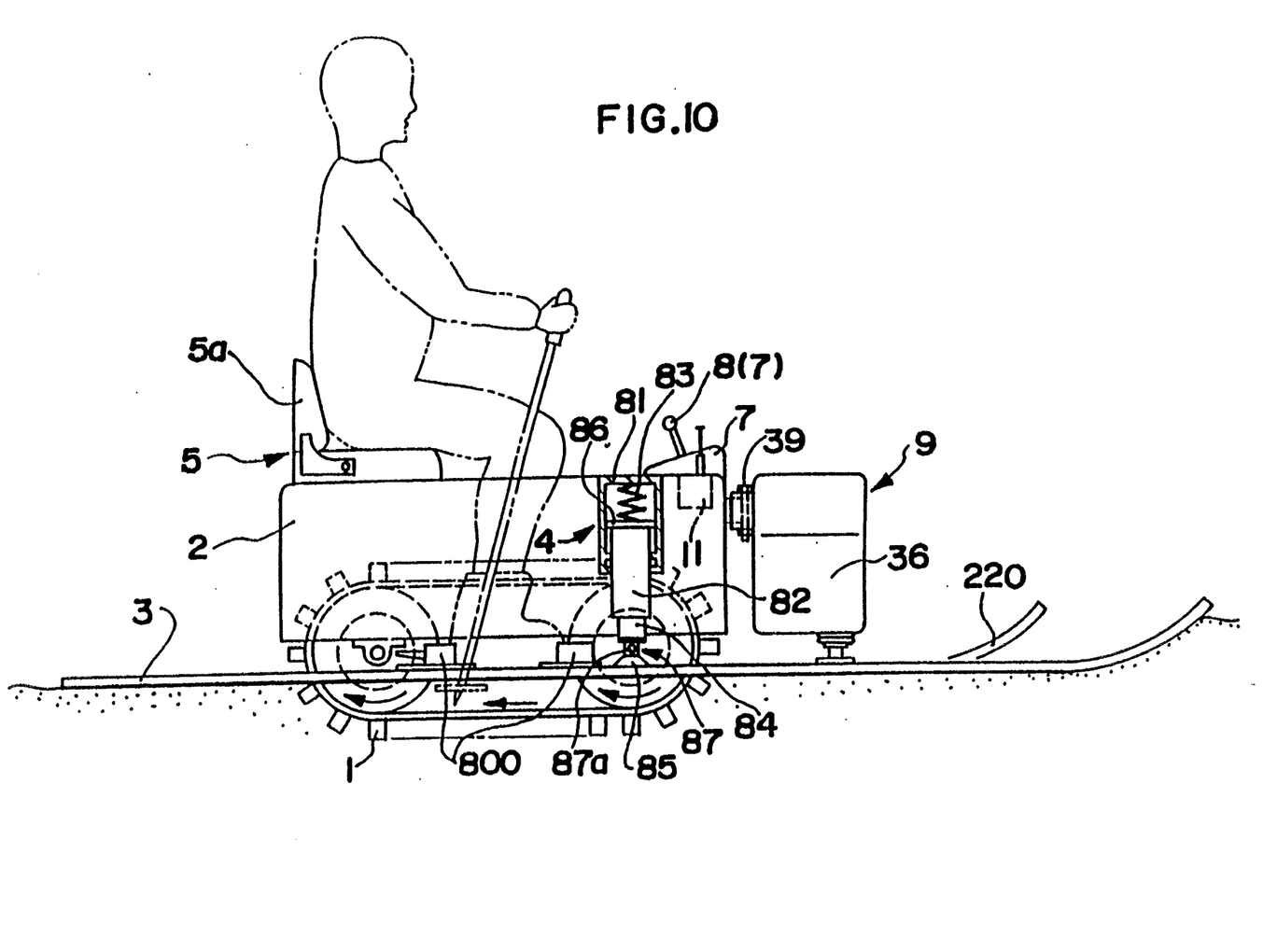
FIG. 10 is a partially cut-away side view of the embodiment of FIG. 9.
Figure 11:
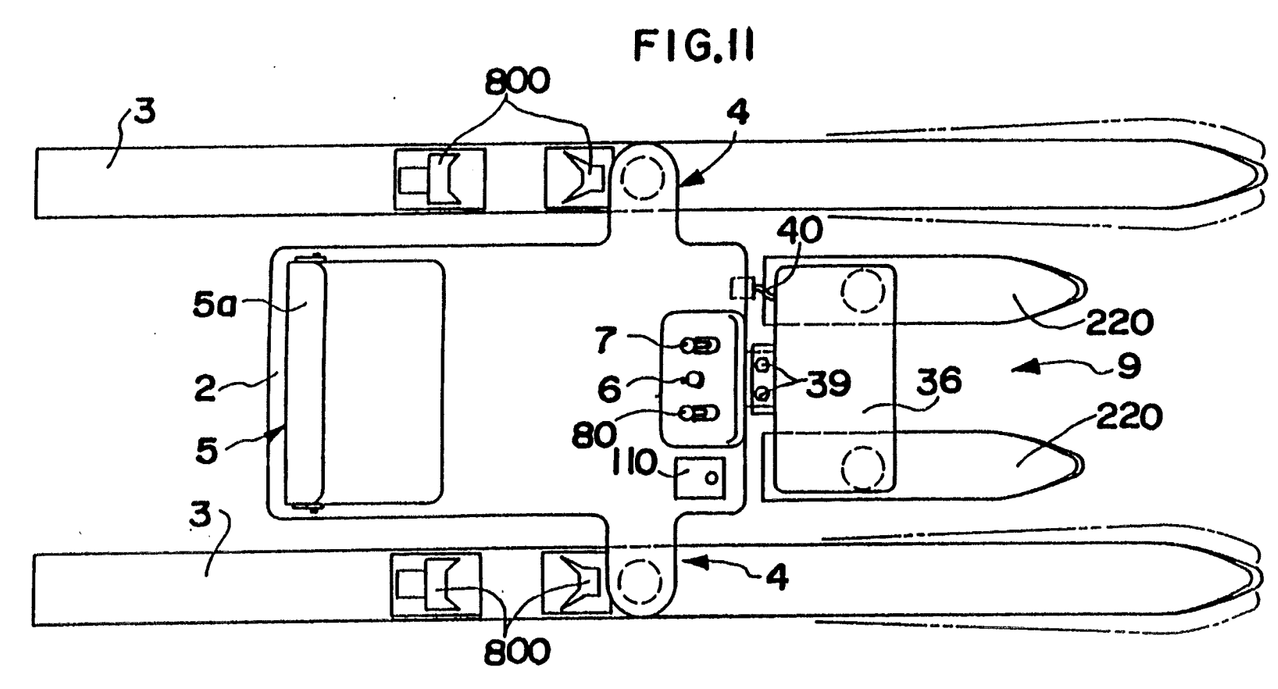
FIG. 11 is plan view of the embodiment of FIG. 9.
Figure 12:
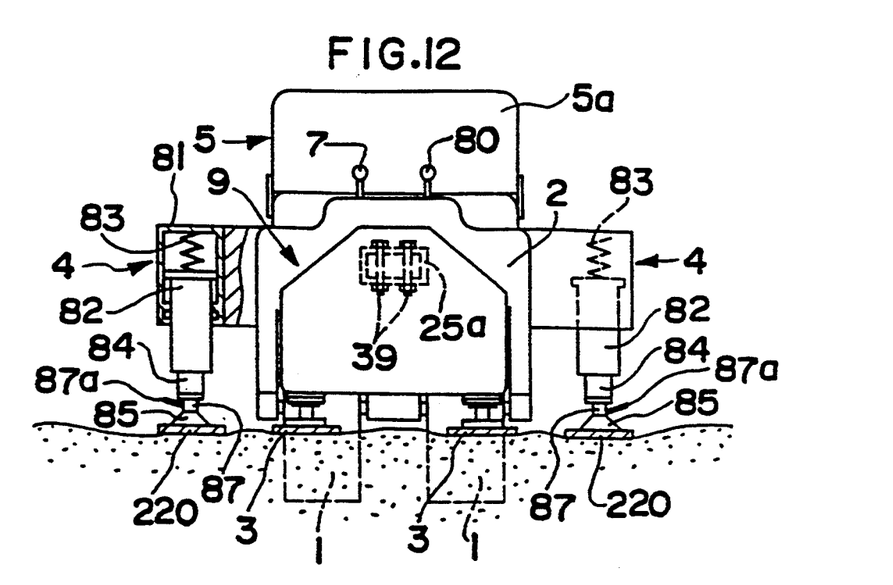
FIG. 12 is a partially cut-away front view of the embodiment of FIG. 9.

In FIGS. 9–12, the skis 3 shown mounted in the same manner as in the case of the first embodiment of FIGS. 1–7. Ski bindings 800 are used for fastening the boots of the driver to the skis. The ski mounting brackets 4, as shown in FIG. 10 and FIG. 12, include lifting rods 82 in cylinders 81 that are attached within the main body 2, and each of the lifting rods 82 are pushed downwardly by a spring 83 loaded within the cylinder 81. Suction cups 85 are provided for attachment of the top surface of each ski 3 to the lower side of a lifting rod 82 through a flexible joint 84, and a locking protrusion 86 projects from the upper end of each lifting rod.

When the driver rides on the main body 2, the springs 83 and the springs 35 of the control device 9 are compressed by the load of the main body 2 and the body weight of the driver, and the load on the main body 2 is supported in addition to the caterpillar drive, by the skis 3, the rudders 220.

Figure 20:
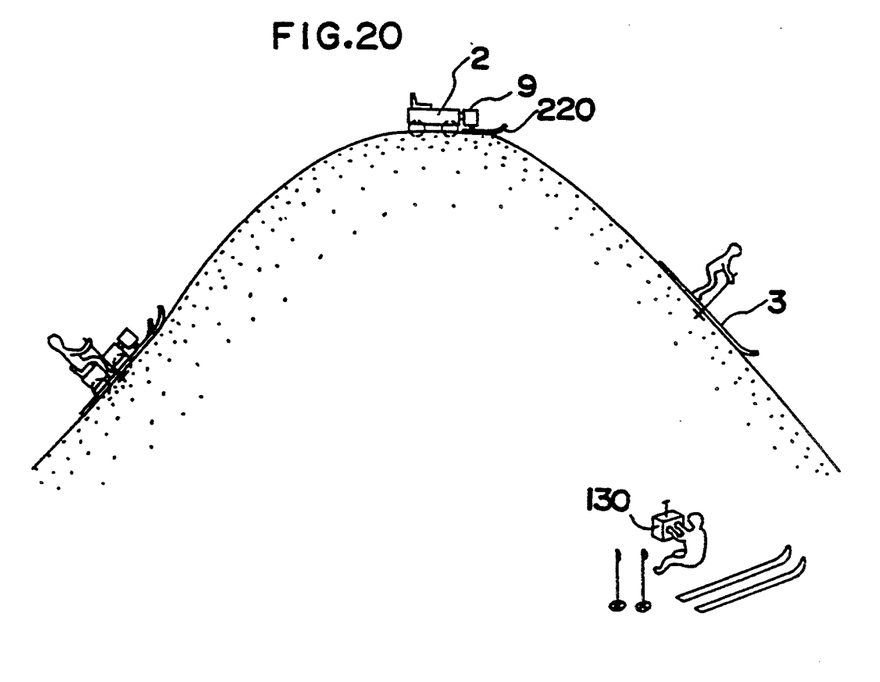
FIG. 20 is an explanatory diagram for showing in the procedure of traveling on the snow by the cart and remotely returning the same cart.

In operation of the remote control system of this second embodiment of the snow cart of the present invention as shown in FIG. 20, after climbing the snow clad mountain with the snow cart, the skis 3 can be detached from the main body 2, and the driver descends on the skis 3. A command signal is transmitted from the foot of the mountain by manipulating the remote control transmitter 130. According to the command signal, the starter 140, remote control brake device 51, remote Control accelerator device 68 and steering rudder control device 7 are remote controlled by radio, and the main body 2 left on the top of the mountain can be returned to any desired location.

I claim:

1. A snow cart comprising a main body having two sides, a caterpillar drive on said main body, a pair of skis each extending along a side of said main body, a seat for a driver of said cart being mounted from said body, ski holding means for attaching each ski to the main body to allow vertical displacement of the ski attached thereby relative to the main body, each ski being attached removably to the ski holding means, and means on each ski for selectively relieving said main body from the weight of the driver.

2. The snow cart of claim 1, wherein said ski holding means attaches each ski longitudinally and laterally tiltably.

3. The snow cart of claim 1, wherein said means for relieving comprises means on each ski for attaching a respective foot of the driver to the ski.

4. The snow cart of claim 1, wherein each of said skis extend both forwardly and rearwardly of said main body, the cart further comprising an engine for driving the caterpillar drive, means for starting the engine, and means for controlling the speed of the engine.

5. The snow cart of claim 4, further comprising radio control means for remote control of said member starting the engine, and said means for controlling the speed.

6. The snow cart of claim 5, further comprising a brake, and a means for actuating the brake, said means for radio control being adapted to actuate said means for actuating.

7. The snow cart of claim 6, further comprising steering means comprising a guide board, and a steering motor for actuating the guide board, said means for radio control being adapted to actuate said steering motor.

8. The snow cart of claim 7, wherein said steering means is separable from the snow cart.

* * * * *